(12) United States Patent
Comiskey et al.

(10) Patent No.: US 7,023,420 B2
(45) Date of Patent: Apr. 4, 2006

(54) ELECTRONIC DISPLAY WITH PHOTO-ADDRESSING MEANS

(75) Inventors: Barrett Comiskey, Cambridge, MA (US); Russell J. Wilcox, Natick, MA (US)

(73) Assignee: E Ink Corporation, Cambridge, MA (US)

( * ) Notice: Subject to any disclaimer, the term of this patent is extended or adjusted under 35 U.S.C. 154(b) by 313 days.

(21) Appl. No.: 09/683,179

(22) Filed: Nov. 29, 2001

(65) Prior Publication Data

US 2002/0063661 A1    May 30, 2002

Related U.S. Application Data

(60) Provisional application No. 60/253,892, filed on Nov. 29, 2000.

(51) Int. Cl.
G09G 3/34 (2006.01)

(52) U.S. Cl. .................................................. 345/107
(58) Field of Classification Search ................ 345/105, 345/106, 107, 48, 49, 50, 51, 55, 76, 77, 345/82, 87, 88, 63, 72
See application file for complete search history.

(56) References Cited

U.S. PATENT DOCUMENTS

| | | | |
|---|---|---|---|
| 3,358,185 A | 12/1967 | Lally | 315/185 |
| 3,612,758 A | 10/1971 | Evans et al. | 348/803 |
| 3,668,106 A | 6/1972 | Ota | 358/305 |
| 3,700,802 A * | 10/1972 | Markin et al. | 348/790 |
| 4,045,327 A | 8/1977 | Noma et al. | 359/237 |
| 4,071,430 A | 1/1978 | Liebert | 359/241 |
| 4,203,106 A | 5/1980 | Dalisa et al. | 345/107 |
| 4,330,788 A | 5/1982 | Hinz et al. | 347/151 |
| 4,407,565 A | 10/1983 | Saxe | 359/296 |
| 4,450,440 A | 5/1984 | White | 345/35 |
| 4,522,472 A | 6/1985 | Liebert et al. | 359/296 |
| 4,598,960 A | 7/1986 | DiSanto et al. | 439/66 |
| 4,655,897 A | 4/1987 | DiSanto et al. | 359/296 |
| 4,732,830 A | 3/1988 | DiSanto et al. | 430/20 |
| 4,741,604 A | 5/1988 | Kornfeld | 359/296 |
| 4,742,345 A | 5/1988 | DiSanto et al. | 345/107 |
| 4,746,917 A | 5/1988 | DiSanto et al. | 345/107 |
| 4,772,820 A | 9/1988 | DiSanto et al. | 313/505 |
| 4,833,464 A | 5/1989 | DiSanto et al. | 345/107 |
| 4,850,919 A | 7/1989 | DiSanto et al. | 445/24 |
| 4,947,157 A | 8/1990 | DiSanto et al. | 345/107 |
| 4,947,159 A | 8/1990 | DiSanto et al. | 345/107 |

(Continued)

FOREIGN PATENT DOCUMENTS

DE    1 981 022 A    9/1999

(Continued)

OTHER PUBLICATIONS

Beilin, S., et al, "8.5: 2000-Character Electrophoretic Display", SID 86 Digest, 136 (1986).

(Continued)

*Primary Examiner*—Chanh Nguyen
(74) *Attorney, Agent, or Firm*—David J. Cole

(57) ABSTRACT

An electronic display comprises an electro-optic material (preferably an electrophoretic medium) having a plurality of pixels, and separate first, second and third sets of addressing means for addressing these pixels. Each of the pixels is associated with one addressing means in each of the three sets, such that addressing of any specific pixel requires application of signals within predetermined ranges to each of the three addressing means associated with the specific pixel being addressed.

22 Claims, 11 Drawing Sheets

U.S. PATENT DOCUMENTS

| | | | | |
|---|---|---|---|---|
| 5,041,824 A | 8/1991 | DiSanto et al. | | 345/107 |
| 5,053,763 A | 10/1991 | DiSanto et al. | | 345/107 |
| 5,066,105 A | 11/1991 | Yoshimoto et al. | | 349/53 |
| 5,066,946 A | 11/1991 | DiSanto et al. | | 345/107 |
| 5,077,157 A | 12/1991 | DiSanto et al. | | 430/20 |
| 5,119,218 A | 6/1992 | Yoshimoto et al. | | 349/41 |
| 5,128,785 A | 7/1992 | Yoshimoto et al. | | 349/53 |
| 5,174,882 A | 12/1992 | DiSanto et al. | | 359/238 |
| 5,177,476 A | 1/1993 | DiSanto et al. | | 345/107 |
| 5,187,609 A | 2/1993 | DiSanto et al. | | 356/296 |
| 5,216,416 A | 6/1993 | DiSanto et al. | | 345/107 |
| 5,223,115 A | 6/1993 | DiSanto et al. | | 359/238 |
| 5,223,823 A | 6/1993 | DiSanto et al. | | 345/107 |
| 5,247,290 A | 9/1993 | DiSanto et al. | | 345/107 |
| 5,250,938 A | 10/1993 | DiSanto et al. | | 345/107 |
| 5,254,981 A | 10/1993 | DiSanto et al. | | 345/107 |
| 5,266,937 A | 11/1993 | DiSanto et al. | | 345/107 |
| 5,276,438 A | 1/1994 | DiSanto et al. | | 345/107 |
| 5,293,528 A | 3/1994 | DiSanto et al. | | 345/107 |
| 5,302,235 A | 4/1994 | DiSanto et al. | | 216/5 |
| 5,304,439 A | 4/1994 | DiSanto et al. | | 430/20 |
| 5,315,312 A | 5/1994 | DiSanto et al. | | 345/107 |
| 5,345,251 A | 9/1994 | DiSanto et al. | | 345/107 |
| 5,359,346 A | 10/1994 | DiSanto et al. | | 345/107 |
| 5,389,945 A | 2/1995 | Sheridon | | 345/85 |
| 5,402,145 A | 3/1995 | DiSanto et al. | | 345/107 |
| 5,412,398 A | 5/1995 | DiSanto et al. | | 345/107 |
| 5,467,107 A | 11/1995 | DiSanto et al. | | 345/107 |
| 5,499,038 A | 3/1996 | DiSanto et al. | | 345/107 |
| 5,535,027 A | 7/1996 | Kimura et al. | | 359/58 |
| 5,561,443 A | 10/1996 | DiSanto et al. | | 345/107 |
| 5,565,885 A | 10/1996 | Tamanoi | | 345/100 |
| 5,625,460 A | 4/1997 | Tai | | 358/3.14 |
| 5,627,561 A | 5/1997 | Laspina et al. | | 345/107 |
| 5,642,211 A | 6/1997 | Okano et al. | | 349/41 |
| 5,675,719 A | 10/1997 | Matias et al. | | 358/1.16 |
| 5,684,365 A | 11/1997 | Tang et al. | | 315/169.3 |
| 5,684,500 A | 11/1997 | Morin et al. | | 345/92 |
| 5,689,282 A | 11/1997 | Wolfs et al. | | 345/100 |
| 5,694,224 A | 12/1997 | Tai | | 358/3.01 |
| 5,717,515 A | 2/1998 | Sheridon | | 359/296 |
| 5,729,663 A | 3/1998 | Lin et al. | | 358/1.9 |
| 5,760,761 A | 6/1998 | Sheridon | | 345/107 |
| 5,777,782 A | 7/1998 | Sheridon | | 359/296 |
| 5,783,368 A | 7/1998 | Richter et al. | | 430/315 |
| 5,808,783 A | 9/1998 | Crowley | | 359/296 |
| 5,892,504 A | 4/1999 | Knapp | | 345/204 |
| 5,896,117 A | 4/1999 | Moon | | 345/95 |
| 5,898,416 A | 4/1999 | Kuijk et al. | | 345/90 |
| 5,904,545 A | 5/1999 | Smith et al. | | 438/455 |
| 5,930,026 A | 7/1999 | Jacobson et al. | | 359/256 |
| 5,961,804 A | 10/1999 | Jacobson et al. | | 204/606 |
| 5,978,052 A | 11/1999 | Ilcisin et al. | | 348/797 |
| 6,002,384 A | 12/1999 | Tamai et al. | | 345/95 |
| 6,017,584 A | 1/2000 | Albert et al. | | 427/313.3 |
| 6,057,814 A | 5/2000 | Kalt | | 345/58 |
| 6,064,784 A | 5/2000 | Whitehead et al. | | 385/18 |
| 6,067,185 A | 5/2000 | Albert et al. | | 359/296 |
| 6,081,285 A | 6/2000 | Wen et al. | | 347/111 |
| 6,113,810 A | 9/2000 | Hou et al. | | 252/572 |
| 6,118,426 A | 9/2000 | Albert et al. | | 345/107 |
| 6,120,588 A | 9/2000 | Jacobson | | 106/31.16 |
| 6,120,839 A | 9/2000 | Comiskey et al. | | 427/213.3 |
| 6,124,851 A | 9/2000 | Jacobson | | 345/206 |
| 6,130,773 A | 10/2000 | Jacobson et al. | | 359/296 |
| 6,130,774 A | 10/2000 | Albert et al. | | 359/296 |
| 6,172,798 B1 | 1/2001 | Albert et al. | | 359/296 |
| 6,177,921 B1 | 1/2001 | Comiskey et al. | | 345/107 |
| 6,232,950 B1 | 5/2001 | Albert et al. | | 345/107 |
| 6,241,921 B1 | 6/2001 | Jacobson et al. | | 264/1.36 |
| 6,249,271 B1 | 6/2001 | Albert | | 345/107 |
| 6,252,564 B1 | 6/2001 | Albert | | 345/1.3 |
| 6,262,706 B1 | 7/2001 | Albert | | 345/107 |
| 6,262,833 B1 | 7/2001 | Loxley et al. | | 359/296 |
| 6,300,932 B1 | 10/2001 | Albert | | 345/107 |
| 6,312,304 B1 | 11/2001 | Duthaler et al. | | 445/24 |
| 6,312,971 B1 | 11/2001 | Amundson et al. | | 438/99 |
| 6,323,989 B1 | 11/2001 | Jacobson et al. | | 359/296 |
| 6,327,072 B1 | 12/2001 | Comiskey et al. | | 359/296 |
| 6,376,828 B1 | 4/2002 | Comiskey | | 250/216 |
| 6,377,387 B1 | 4/2002 | Duthaler et al. | | 359/296 |
| 6,392,785 B1 | 5/2002 | Albert et al. | | 359/296 |
| 6,392,786 B1 | 5/2002 | Albert | | 359/296 |
| 6,413,790 B1 | 7/2002 | Duthaler et al. | | 438/21 |
| 2001/0045934 A1 | 11/2001 | Turner et al. | | 345/107 |
| 2001/0046081 A1 | 11/2001 | Hayashi et al. | | 359/296 |
| 2002/0018042 A1 | 2/2002 | Albert et al. | | 345/107 |
| 2002/0019081 A1 | 2/2002 | Denis et al. | | 348/149 |
| 2002/0021270 A1 | 2/2002 | Albert | | 345/84 |
| 2002/0053900 A1 | 5/2002 | Jacobson et al. | | 324/100 |
| 2002/0060321 A1 | 5/2002 | Kazlas et al. | | 257/66 |
| 2002/0063677 A1 | 5/2002 | Drzaic | | 345/107 |
| 2002/0106847 A1 | 8/2002 | Kazlas et al. | | 438/200 |

FOREIGN PATENT DOCUMENTS

| | | |
|---|---|---|
| EP | 0 924 511 A1 | 6/1999 |
| JP | 03-091722 A | 4/1991 |
| JP | 03-096925 A | 4/1991 |
| JP | 05-173194 A | 7/1993 |
| JP | 09-185087 A | 7/1997 |
| JP | 11-219135 A | 8/1999 |
| JP | 2000-322004 A | 11/2000 |
| WO | WO 93/02443 | 2/1993 |
| WO | WO 93/05425 | 3/1993 |
| WO | WO 93/07608 | 4/1993 |
| WO | WO 95/05622 | 2/1995 |
| WO | WO 95/06307 | 3/1995 |
| WO | WO 95/07527 | 3/1995 |
| WO | WO 95/10107 | 4/1995 |
| WO | WO 96/41372 | 12/1996 |
| WO | WO 97/04398 | 2/1997 |
| WO | WO 98/03896 | 1/1998 |
| WO | WO 98/19208 | 5/1998 |
| WO | WO 98/41898 | 9/1998 |
| WO | WO 98/41899 | 9/1998 |
| WO | WO 99/10767 | 3/1999 |
| WO | WO 99/10768 | 3/1999 |
| WO | WO 99/10769 | 3/1999 |
| WO | WO 99/47970 | 9/1999 |
| WO | WO 99/53371 | 10/1999 |
| WO | WO 99/53373 | 10/1999 |
| WO | WO 99/56171 | 11/1999 |
| WO | WO 99/59101 | 11/1999 |
| WO | WO 99/60554 | 11/1999 |
| WO | WO 99/67678 | 12/1999 |
| WO | WO 00/03291 | 1/2000 |
| WO | WO 00/03349 | 1/2000 |
| WO | WO 00/05704 | 2/2000 |
| WO | WO 00/20921 | 4/2000 |
| WO | WO 00/20922 | 4/2000 |
| WO | WO 00/20923 | 4/2000 |
| WO | WO 00/26761 | 5/2000 |
| WO | WO 00/36465 | 6/2000 |
| WO | WO 00/36560 | 6/2000 |
| WO | WO 00/36666 | 6/2000 |
| WO | WO 00/38000 | 6/2000 |
| WO | WO 00/38001 | 6/2000 |
| WO | WO 00/59625 | 10/2000 |
| WO | WO 00/60410 | 10/2000 |
| WO | WO 00/67110 | 11/2000 |
| WO | WO 00/67327 | 11/2000 |
| WO | WO 01/02899 | 1/2001 |
| WO | WO 01/07961 | 2/2001 |

| | | |
|---|---|---|
| WO | WO 01/08241 | 2/2001 |
| WO | WO 01/08242 | 2/2001 |
| WO | WO 01/17029 | 3/2001 |
| WO | WO 01/17040 | 3/2001 |
| WO | WO 01/17041 | 3/2001 |
| WO | WO 01/24153 | 4/2001 |
| WO | WO 01/80287 | 10/2001 |

OTHER PUBLICATIONS

Chen, Y., et al., "A Conformable Electronic Ink Display using a Foil-Based a-Si TFT Array", SID 01 Digest, 157 (Jun. 2001).

Chiang, A., "Reduction of Lateral Migration in Matrix Addressed Electrophoretic Display", Xerox Disclosure Journal, 5, 73 (1980).

Chiang, A., et al., "A High Speed Electrophoretic Matrix Display", SID 80 Digest (1980), 114.

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Dalisa, A.L., "Electrophoretic Display Technology", IEEE Trans. Electron Dev., ED-24, 827 (1977).

Dalisa, A.L., "Electrophoretic Displays", in Pankove, J.L. (ed.), "Display Devices", Springer-Verlag, Berlin (1980), pp. 215-232.

Drzaic, P., et al., "A Printed and Rollable Bistable Electronic Display", SID 98 Digest (1998), p. 1131.

Hopper, M.A., et al., "An Electrophoretic Display, Its Properties, Model and Addressing", IEEE Trans. Electron Dev., ED-26, 1148 (1979).

Kazlas, P., et al., "12.1 SVGA Microencapsulated Electrophoretic Active Matrix Display for Information Applicances", SID 01 Digest, 152 (Jun. 2001).

Shiffman, R.R., et al., "An Electrophoretic Image Display with Internal NMOS Address Logic and Display Drivers," Proceedings of the SID, 1984, vol. 25, 105 (1984).

Tannas et al., "Flat -panel displays: a critique", IEEE Spectrum, Jul. 1978, p. 27.

Vaz, N.A., et al., "Dual-frequency addressing of polymer-dispersed liquid-crystal films", J. Appl. Phys., 65, 5043 (1989).

Jacobson, J., et al., "The last book", IBM Systems J., 36, 457 (1997).

* cited by examiner

ELECTRONIC DISPLAY WITH PHOTO-ADDRESSING MEANS

CROSS REFERENCE TO RELATED APPLICATIONS

This application claims priority from Provisional Application Ser. No. 60/253,892 filed Nov. 29, 2000, the entire disclosure of which is herein incorporated by reference.

BACKGROUND OF INVENTION

The present invention relates to addressing schemes for electronic displays, that is to say displays which use a display medium at least one optical characteristic of which can be varied by subjecting the medium to an electric field.

Electronic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

One important sub-group of electronic displays are electrophoretic displays, which have been the subject of intense research and development for a number of years. Such displays can have attributes of good brightness and contrast, wide viewing angles, state bistability, and low power consumption when compared with liquid crystal displays. (The terms "bistable"and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist without power for at least several times, for example at least four times, the minimum duration of the addressing pulse required to change the state of the display element.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; and 6,312,304, and in International Applications Publication Nos. WO 97/04398; WO 98/03896; WO 98/19208; WO 98/41898; WO 98/41899; WO 99/10769; WO 99/10768; WO 99/10767; WO 99/53373; WO 99/56171; WO 99/59101; WO 99/47970; WO 00/03349; WO 00/03291; WO 99/67678; WO 00/05704; WO 99/53371; WO 00/20921; WO 00/20922; WO 00/20923; WO 00/26761; WO 00/36465; WO 00/38000; WO 00/38001; WO 00/36560; WO 00/20922; WO 00/36666; WO 00/59625; WO 00/60410; WO 00/67110; WO 00/67327 WO 01/02899; WO 01/07691; WO 01/08242; WO 01/17029; WO 01/17040; and WO 01/80287. The entire disclosures of all these patents and published applications are herein incorporated by reference.

An encapsulated, electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

It is shown in copending Application Ser. No. 60/280,951, filed Apr. 2, 2001 (the entire disclosure of which is herein incorporated by reference) that some particle-based electrophoretic are capable of gray scale and that such gray scale displays are stable not only in their extreme black and white states but also in their intermediate gray states. Methods to achieve gray states include spatial, temporal and voltage addressing methods such as dithering, time-width modulation, and voltage-height modulation. Thus, this type of display is properly called "multi-stable" rather than bistable, although the latter term may be used for convenience herein.

The bistable or multi-stable behavior of electrophoretic displays (and other electro-optic displays displaying similar behavior) is in marked contrast to that of conventional liquid crystal ("LC") displays. Twisted nematic liquid crystals act are not bi- or multi-stable but act as essentially instantaneous voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, a pixel of an LC display is not sensitive to the polarity of the electric field, only to its magnitude, and indeed to avoid undesirable effects, such as damage to electrodes, caused by current imbalance through a display, commercial LC displays usually reverse the polarity of the driving field at frequent intervals. In contrast, electrophoretic displays act as impulse transducers, so that the final state of a pixel depends not only upon the electric field applied and the time for which this field is applied, but also upon the state of the pixel prior to the application of the electric field.

The bistable or multi-stable (also sometimes referred to as "latching" or "memory") characteristics of electrophoretic displays affect the choice of addressing methods to be used with such displays. Other factors which influence the choice of addressing methods to be used include the need for DC addressing because of the sensitivity of electrophoretic displays to the polarity of the electric field, and the desirability of DC-balanced waveforms; to avoid potentially harmful changes at the electrodes, it is desirable that the algebraic sum of the impulses applied to any given pixel of an electrophoretic display over time be zero. Also, the addressing method should allow for the lack of a threshold in electrophoretic displays; since such displays are impulse transducers, with a nearly linear relationship between (a) the product of voltage and time and (b) the change in optical characteristic of the display, even a small voltage applied for a substantial time will cause a change in the optical characteristic of the display. This normally precludes the use of passive matrix addressing methods.

Frequently, high resolution electrophoretic displays consist of pixels laid out in an array, with a transistor construction behind each pixel in a so-called "active matrix" arrangement. This arrangement can further be subdivided into sub-pixels. However all the transistors are in a plane, and control an array of bottom electrodes that are either on the same plane or on an adjacent plane just above or below. As such, the array is addressed in a two-dimensional or XY manner where pixels are referenced by row and column.

One problem with such high resolution displays is the sheer number of drivers required. In an array addressed in an XY manner, if there are x columns and y rows, x+y drivers are needed to address x*y pixels. For example, a color 640×480 display with three sub-pixels per pixel has 640×480×3=921,600 pixels and would typically be addressed by 480 row drivers and 1920 column drivers for a total of 2400 display drivers. Especially in small displays, the cost of the drivers rivals or may outweigh the cost of the electro-optic material.

In one aspect, the present invention provides an electronic display which reduces the number of drivers required.

Another problem with such high resolution displays is the time taken to address the display. Normally, in an active matrix display, one row of the display is activated at a time, and all the pixels in that row are addressed by applying appropriate voltages to the various columns. If addressing one row takes k seconds, at least k*y seconds are required to address the complete display. If the addressing scheme used requires that each row be addressed for the time necessary to completely address an electrophoretic medium (which is typically of the order of 100 milliseconds), the total time taken to address the display may be undesirably great. Similar considerations apply to displays using other types of electro-optic materials.

In another aspect the present invention provides various methods for reducing the time needed to completely address an electronic display.

SUMMARY OF INVENTION

Accordingly, in one aspect, this invention provides an electronic display comprising an electro-optic material having a plurality of pixels, and separate first, second and third sets of addressing means for addressing the pixels, each of the pixels being associated with one addressing means in each of the three sets, such that any specific pixel of the display can be addressed by application of signals within predetermined ranges to each of the three addressing means associated with that specific pixel.

This invention also provides an electronic display comprising an electro-optic material havin a plurality of separately addressable pixels, wherein the number of driver outputs to the pixels is less than the square root of the number of pixels.

In another aspect, this invention provides a method of addressing an electronic display, the method comprising:
providing an electro-optic material having a plurality of pixels;
providing first, second and third sets of addressing means for addressing the pixels, each of the pixels being associated with one addressing means in each of the three sets; and
applying predetermined signals to the three addressing means associated with a specific pixel, thereby addressing this pixel.

This type of addressing method will hereinafter be called "three-dimensional addressing" and the corresponding display may be called a "three-dimensional display", it being understood that this does not necessarily imply that the pixels of the display have substantial extent in all three dimensions; for example, the pixels might be arranged in a large planar array, but electrically grouped into sub-arrays for purposes of addressing the display, with the selection of any one sub-array being made by the third set of addressing means.

In another aspect, this invention provides a method of addressing a bistable electronic display having a plurality of pixels arranged in any array comprising a plurality of rows and plurality of solumns, the method comprising selecting a plurality of rows or columns and applying a simultaneous and equivalent switching impulse to all selected rows and columns.

In another aspect, this invention provides a method of addressing a bistable electronic display having a plurality of pixels arranged in a plurality of rows, the method comprising:

(a) comparing a starting state of the display with a desired finishing state and determining for each pixel a change value representative of the change needed to change the starting state of that pixel to its desired finishing state; and (b) calculating from the pixel change values for each row, a switch direction value for that row, this switch direction value representing the value for which, if all pixels in that row were changed by the switch direction value, the row switch time required to switch the row to the desired finishing state would be minimized.

This method may also include any one or more of the following steps:

(c) calculating the average switch direction value for all rows of the display;

(d) identifying all rows with switch direction values less than the average switch direction value calculated in step (c);

(e) calculating the average switch direction value of all rows identified in step (d);

(f) applying to all rows identified in step (d) an impulse sufficient to cause a change in state equal to the average switch direction value calculated in step (e);

(g) identifying all rows with switch direction values greater than the average switch direction value calculated in step (c);

(h) calculating the average switch direction value of all rows identified in step (g); and (i) applying, to all rows identified in step (g), an impulse sufficient to cause a change in state equal to the average switch direction value calculated in step (g).

In another aspect, this invention provides a method of addressing a bistable electronic display having a plurality of pixels, each of these pixels having a first display state, a second display state differing in at least one optical characteristic from the first display state, and a plurality of intermediate states having values of this optical characteristic intermediate those of the first and second display states. The method comprises driving all the pixels of the display to the same one of the intermediate states; and thereafter addressing the pixels individually to drive them to their desired states.

In another aspect, this invention provides a method of addressing a bistable electronic display having a plurality of pixels arranged in a plurality of rows and columns. The method comprises:

(a) comparing a starting state of the display with a desired finishing state and determining for each pixel a change value representative of the change needed to change the starting state of that pixel to its desired finishing state;

(b) comparing the change values of pixels in differing rows but the same column and locating at least two of these pixels having the same change value; and (c) addressing these at least two pixels having the same value simultaneously by addressing the rows and the column on which these pixels are located.

In another aspect this invention provides a method of addressing a bistable electronic display having a plurality of pixels, the method comprising comparing a starting state of the display with a desired finishing state and determining which pixels differ between the two states; and addressing only those pixels which differ between the two states.

Finally, this invention provides a method of addressing a bistable electronic display having a plurality of pixels. This method comprises:

providing an array of island capacitors associated with the pixels of the display;

through passive matrix XY addressing, introducing electrical charge into the capacitors in a pattern matching the image desired on the display; and thereafter allowing the charges on the capacitors to complete the addressing of the pixels of the display.

Figure 1:
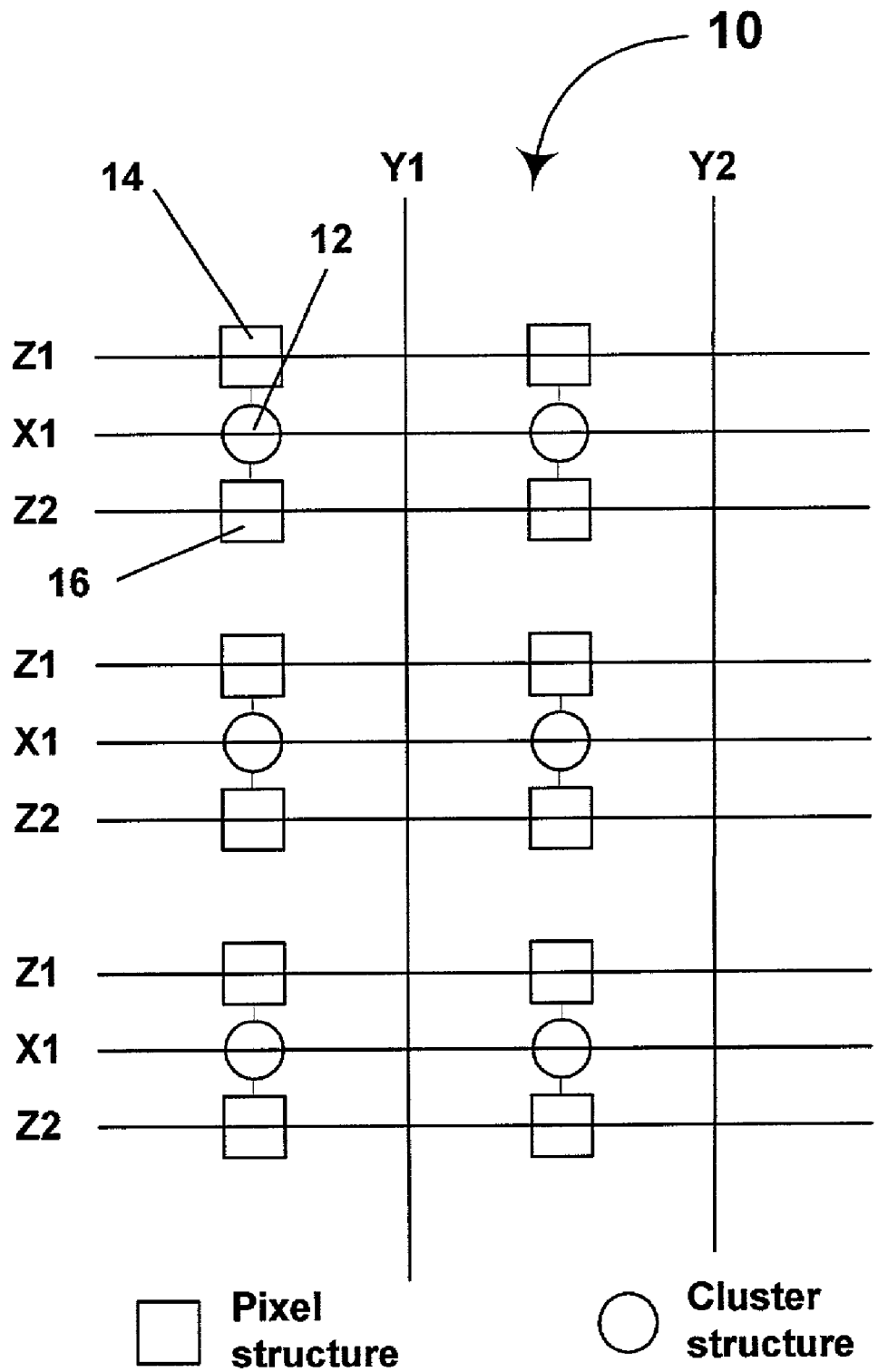
FIGS. 1, 2 and 3 of the accompanying drawings are schematic circuit diagrams of first, second and third three-dimensionally addressed displays of the present invention.

The accompanying drawings are highly schematic and not to scale, emphasis instead generally being placed upon illustrating the principles of the invention.

DETAILED DESCRIPTION

As already mentioned, the three dimensional displays and methods of the present invention use an electro-optic material having a plurality of pixels, and separate first, second and third sets of addressing means for addressing the pixels.

In this display and method, each of the pixels is associated with one addressing means in each of the three sets, such that addressing of any specific pixel requires application of signals within predetermined ranges to each of the three addressing means associated with that specific pixel. The additional dimension is accomplished by introducing a method of addressing sub-arrays within the array. By thus substituting a three-dimensional addressing scheme for a two-dimensional one, the number of drivers can be greatly reduced. In effect, the present invention splits the display into z regions, each addressable by the x columns and y rows, enabling the entire display of $x*y*z$ pixels to be addressed by $x+y+z$ drivers. For example, the aforementioned color 640×480 display with three sub-pixels per pixel could be addressed by 64 columns and 240 rows replicated across 60 regions for a total of 364 drivers for the same 921,600 pixels, reducing driver cost substantially. In this and many other cases of practical nterest, the present invention enables the number of drivers (or more accurately driver outputs, to be reduced to less than the square roots of the number of pixels in the display, a highly desirable result which cannot be achieved by conventional addressing methods. The additional dimension may comprise only a logical sub-array, or may include a physical sub-array that may even comprise an additional layer in the display stack.

In the three-dimensional display of the present invention, in which the pixels are arranged in a plurality of sub-arrays, each pixel within any specific sub-array can be associated with one of the first and second sets of addressing means, and the third set of addressing means can have the form of a plurality of switching means, at least one of which is associated with each sub-array, the switching means associated with each sub-array having an off state, in which signals on at least one of the first and second sets of addressing means are prevented from reaching the associated sub-array, and an on state, in which signals from both the first and second sets of addressing means are permitted to reach and address the associated sub-array. Such a display may have control means arranged to control the switching means so that only the switching means associated with one sub-array is in its on state at any given moment.

Thus, for example, the additional layer of logic may consist of a platform hierarchy. In this hierarchy, one transistor may act as a gate that controls additional transistors. This may be accomplished physically by wiring a cluster of transistors to a central transistor. The central transistor may be in the same plane as the pixel transistors or may be in a different layer but still in electrical communication. In this approach the cluster-level transistor and the pixel-level transistor can be individual transistors or whole logic structures capable of some degree of intelligence and processing. The cluster transistors may be addressed in an XY manner with an addressing signal that communicates how the sub-array should be addressed. This hierarchy may be repeated in multiple logical or physical layers, permitting many pixels to be addressed by a few central transistors.

Because of the bistable nature of electrophoretic displays, one way to utilize the hierarchy involves first setting the cluster logic structures to open electrical communication to one (or a subset in parallel) of the downstream pixels. These pixels are then addressed by an XY scan. The clusters are then reset to open communication with a different set of downstream pixels. These pixels are then addressed by an XY scan; however the image from the first set of pixels is not lost because it remains visible even when not being addressed.

In one form of the invention using sub-arrays, each sub-array comprises a discrete page, the pages formed by the plurality of sub-arrays being stacked on top of each other so that the entire display forms a multi-page electronic book. Thus, this invention provides economical devices that look and feel like multi-page books. Such a book may have conductive vias extending between adjacent pages and connecting at least one of the first and second sets of addressing means on the adjacent pages. A display of this type is described below with reference to FIG. 4. Alternatively, each sub-array may correspond to a different column in a newspaper, and thus the present invention provides a large paper-like display the size of a newspaper broadsheet that may be economically addressed.

As already indicated, in the three-dimensional display of the present invention, the first second and third sets of addressing devices can all have the form of electrical conductors and/or electronic devices, typically transistors. However, the present invention is not restricted to this purely electrically or electronic approach. In another approach, the operation of sub-arrays within a basic pixel array are made contingent on an external gate based on temperature, light, vibration, magnetism, radio waves, or other suitable force. For example, suppose the pixel-level logic structures comprise microelectromechanical system (MEMS) devices with a meal see-saw switch that cannot move in the presence of a magnetic field. An array of such structures is addressed with XY coordinates. However, adjacent to such array is a layer of material capable of emitting a magnetic field, this layer being divided into halves. When only one half is active, only half the display can be addressed. Suppose that the Y addressing means are wired in parallel so that activating the Yth column activates two columns, one in each half. Only the column not in the magnetic field actually causes switching to occur. In this manner, the magnetic layer provides another addressing dimension, permitting three-dimensional addressing.

The three-dimensional addressing methods of the present invention may be especially useful when at least one of the sets of addressing devices makes use of a photoconductor. The display may comprise a light source (for example, a light-emitting layer) associated with the photoconductor and selectively operable to switch the photoconductor between a conductive and a non-conductive state. The light source may be an electroluminescent material. Alternatively, the display may comprise a light source associated with the photoconductor and a light valve disposed between the light source and the photoconductor and arranged to control transmission of light from the light source to the photoconductor. Any suitable light valve maybe used, including light valves operating by use of polymer-dispersed liquid crystal (PDLC), suspended particle and electrochromicity. A PDLC light valve is a preferred embodiment due to the relative ease of obtaining thin sheets of such media at low cost.

Although using light valves has the disadvantages that a large proportion of the light emitted from the light-emitting layer is wasted, reducing device lifetime, and an additional layer is required, thickening the medium and complicating manufacture, these disadvantages tend to be outweighed by the major advantage that light valve layers can be made inexpensive and flexible.

There are a variety of arrangements available with light valves. For example, in one embodiment, the display may comprise a plurality of light sources arranged as a series of elongate rows, and a plurality of light valves arranged as series of elongate columns crossing the elongate rows, the light sources and light valves together defining a two-dimensional array of pixels in the photoconductor. In another embodiment, the display may have the form of a plurality of pages stacked on top of one another to form a multi-page electronic display, and each page may have a single light source and a single light valve, so that the page or pages to be written at any given moment are selected by controlling the state of the light valves. In a further embodiment, the first addressing means comprises a plurality of electrical conductors and means for applying potentials selectively to these conductors, the second addressing means comprises a plurality of light emitting devices and means for generating light selectively from these light emitting devices, and the third addressing means comprises a plurality of light valves and means for selectively setting these light valves to their transmissive or non-transmissive states.

One convenient application of the three-dimensional addressing schemes of the present invention is in electronic displays having three sets of pixels arranged to display different colors. In this type of display, the third set of addressing means may be arranged to select one of the three sets of pixels to be addressed at any given moment. A display of this type is described below with reference to FIG. 8.

The present display and method are not restricted to the use of only three dimensions for addressing. A display of the present invention may comprise a fourth set of addressing means for addressing the pixels, this fourth set being separate from the first, second and third sets of addressing means. Each of the pixels of the display is associated with one addressing means in each of the four sets, such that addressing of any specific pixel of the display requires application of signals within predetermined ranges to each of the four addressing means associated with that specific pixel, thus providing a four-dimensional addressing scheme. For example, in the embodiment of the invention described above which simulates a broadsheet newspaper, it may be convenient to divide the large display into a two-dimensional grid of sub-arrays, each sub-array being addressed in the conventional XY manner by the first and second sets of addressing means, while the selection of the sub-array to be addressed at any given moment is controlled, also in an XY manner, by the third and fourth sets of addressing means.

As already indicated, the electro-optic material used in the display of the present invention is preferably an electrophoretic medium, most desirably an encapsulated electrophoretic medium, as described in the aforementioned patents and published applications. The present invention requires no modification of the electrophoretic medium itself, so the preferred media will not be described in detail herein, the reader being referred to the aforementioned patents and published applications which describe the preferred electrophoretic media in detail. Other types of electro-optic materials could also be used. The electro-optic medium could, for example, be of the rotating bichromal object type as described, for example, in U.S. Pat. Nos. 5,803,783; 5,777,782 and 5760,761. The medium could also be any of the class of electrochromic and suspended particle displays. Other types of electro-optic materials, include, for example, liquid crystal, especially polymer-dispersed and/or reflective liquid crystal, and suspended rod-shaped particle devices; see Saxe, Information Display, April/May 1996 (Society for Information Display), and U.S. Pat. No. 4,407,565.

Embodiments of the invention will now be described, though by way of illustration only, with reference to the accompanying drawings.

As already indicated, XYZ addressing can be accomplished when there is a separate method of addressing or affecting the cluster-level transistor structures, aside from the conventional XY array. One very simple example of such addressing is shown in FIG. 1 of the accompanying drawings. This Figure shows a first display of the present invention (generally designated 10) having row drivers X1, X2, X3 and column drivers Y1, Y2. Cluster structures 12 are provided connected to the row drivers X1, X2, X3, these cluster structures each having a first and second states. When the cluster structures 12 are in their first state, they connect the row drivers X1, X2, X3 to the odd lines of the display, designated Z1, thus enabling addressing of pixels 14 located on these odd rows, and isolate the row drivers from the even lines of the display, designated Z2. On the other hand, when the cluster structures 12 are in their second state, they connect the row drivers X1, X2, X3 to the even lines Z2 of the display, thus enabling addressing of pixels 16 located on these even rows, and isolate the row drivers from the odd lines Z1 of the display 10. This logic occurs at the cluster structure (or in such a simple example, could also occur by simply by wiring X and Z together at the pixel structure and splitting the necessary threshold activation voltage in half between them). Thus, the display 10 achieves XYZ addressing that functions in an manner similar to interlacing.

Figure 2:
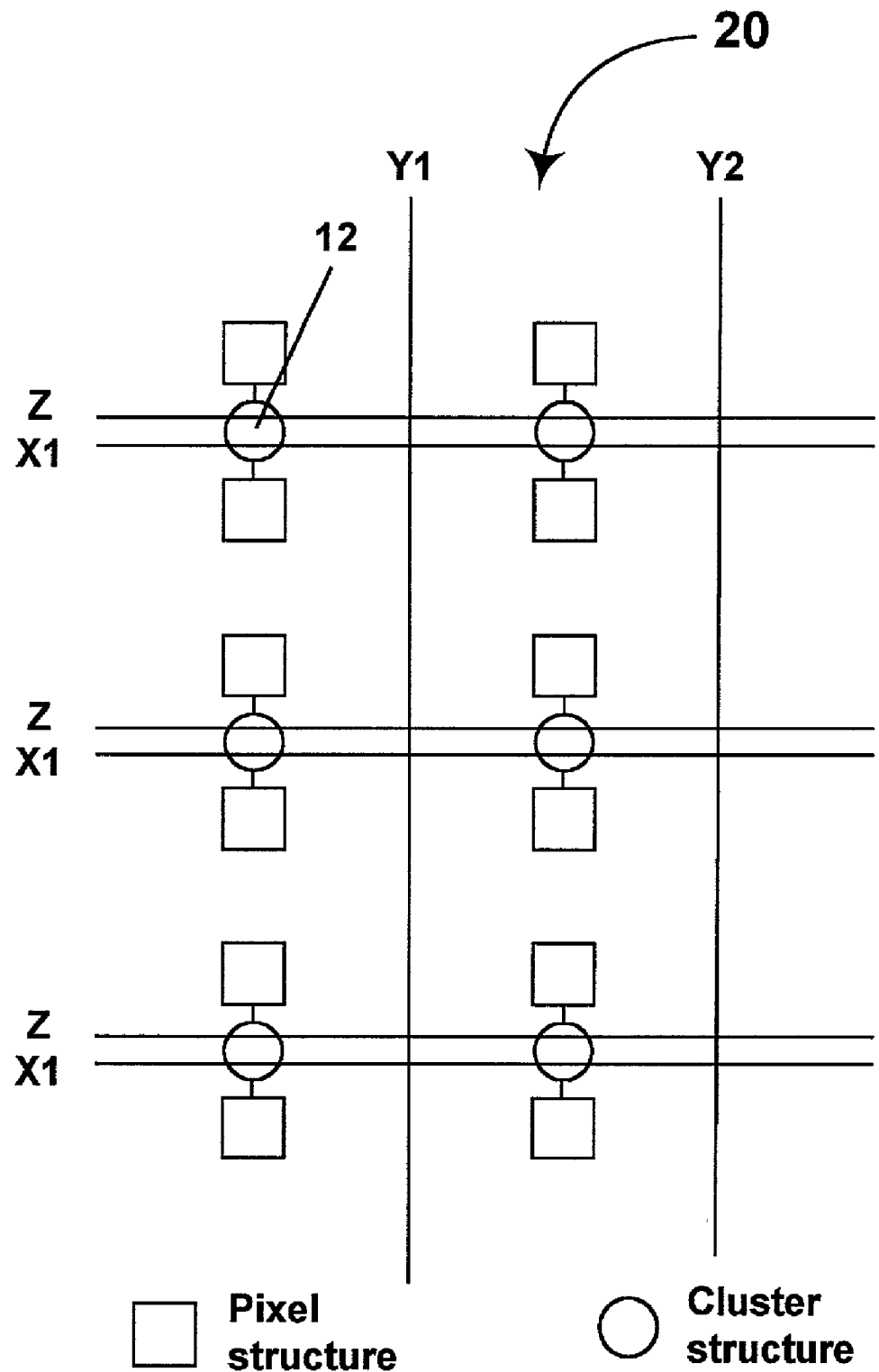

FIG. 2 illustrates a second display (generally designated 20) using a variation of the same approach. In this display 20, a single line Z connected to the clusters 12 can vary between two values, say 0 and 1. The cluster logic is such that when the Z value is 0, the input on row drivers X1, X2, X3 affects the pixels above (in FIG. 2) the clusters 12, but when the Z value is 1, the input on row drivers X1, X2, X3 affects the pixels below the clusters 12.

As already noted, the three-dimensional addressing method of the present invention is particularly useful with displays using photoconductors for addressing. It has previously been proposed to address electronic display media by means of light impinging upon a photoconductor; see, for example, Blazo, High Resolution Electrophoretic Display with Photoconductor Addressing, SID Digest, 1982, pages 92–93, and the aforementioned International Application Publication No. WO 99/47970 of E Ink Corporation. In one such addressing scheme (hereinafter for convenience called the "row light-emitter scheme"), the display comprises in sequence:

(a) a first transparent electrode, typically formed from indium tin oxide (ITO), which is patterned into columns;
(b) the display medium itself, which may be an electrophoretic display medium, preferably an encapsulated electrophoretic display medium;
(c) a photoconductor layer;
(d) a second, light-transmissive electrode in electrical contact with the photoconductor layer; and
(e) a light-emitting layer patterned into rows.

Whenever a row of the light-emitting layer is activated, the corresponding region of the photoconductor is able to conduct current and the columns of the first electrode can control the image of that row. This embodiment is appropriate when the light source (e.g. an electroluminescent (EL) light source) does not have a threshold. One drawback of this approach is that the light from each row must stay on for all or most of the time required for the display medium to image. If this takes k seconds, it may require up to k*y seconds to address y rows.

In a second such addressing scheme (hereinafter for convenience called the "pixelated light-emitter scheme"), the first electrode is not patterned, and the light-emitting layer is pixelated (i.e., patterned into a two-dimensional grid of individually controllable pixels) so that it can apply any desired image to the photoconductor layer. Where light is present, the photoconductor layer conducts current, the corresponding portions of the display medium experience an electric field and the display medium is imaged accordingly. Provided the display medium used is bistable, the light-emitting layer may then be switched off until the image needs to be changed. This addressing scheme is especially useful when the light source (e.g. organic light-emitting diodes (OLED's)) has a threshold and may be passively addressed. An advantage of this approach is that the light pattern is applied across all rows simultaneously and only k seconds are required to address y rows. A disadvantage is that only certain light-emitting materials may be easily multiplexed.

As already noted, both addressing schemes require numerous drivers, for example 2400 drivers for a full color 640×480 display, and in small displays especially the cost of the drivers rivals or may outweigh the cost of the electro-optic material. The present invention enables the number of such drivers to be greatly reduced by forming separately addressable regions or sub-arrays. Such separately addressable regions may be formed in several ways.

Figure 3:
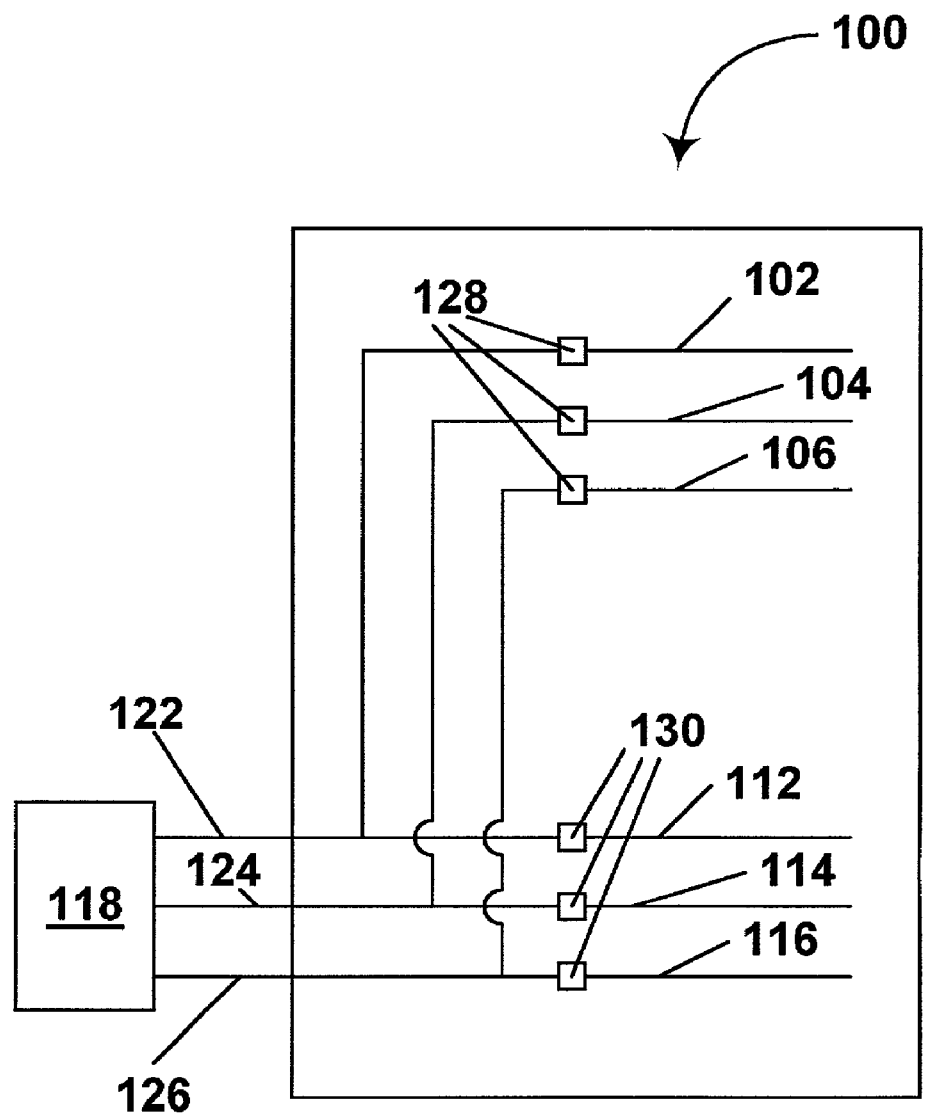

FIG. 3 illustrates one way of forming such separately addressable regions. This Figure shows a third display of the present invention (generally designated 100) having a first region comprising rows 102, 104 and 106 and a second region comprising rows 112, 114 and 116. Each row is connected to a driver 118, the rows 102 and 112 being connected via a driver line 122, the rows 104 and 114 by a driver line 124, and the rows 106 and 116 by a driver line 126. Each row is provided with a logic element 128 or 130, such as a transistor, that governs whether voltage reaches the light-emitting region of a row. As shown in FIG. 3, several rows in different regions may be wired to a common driver line, yet only a combination of voltage across a row and voltage to the associated transistor will result in light emission from any given row.

Figure 4:
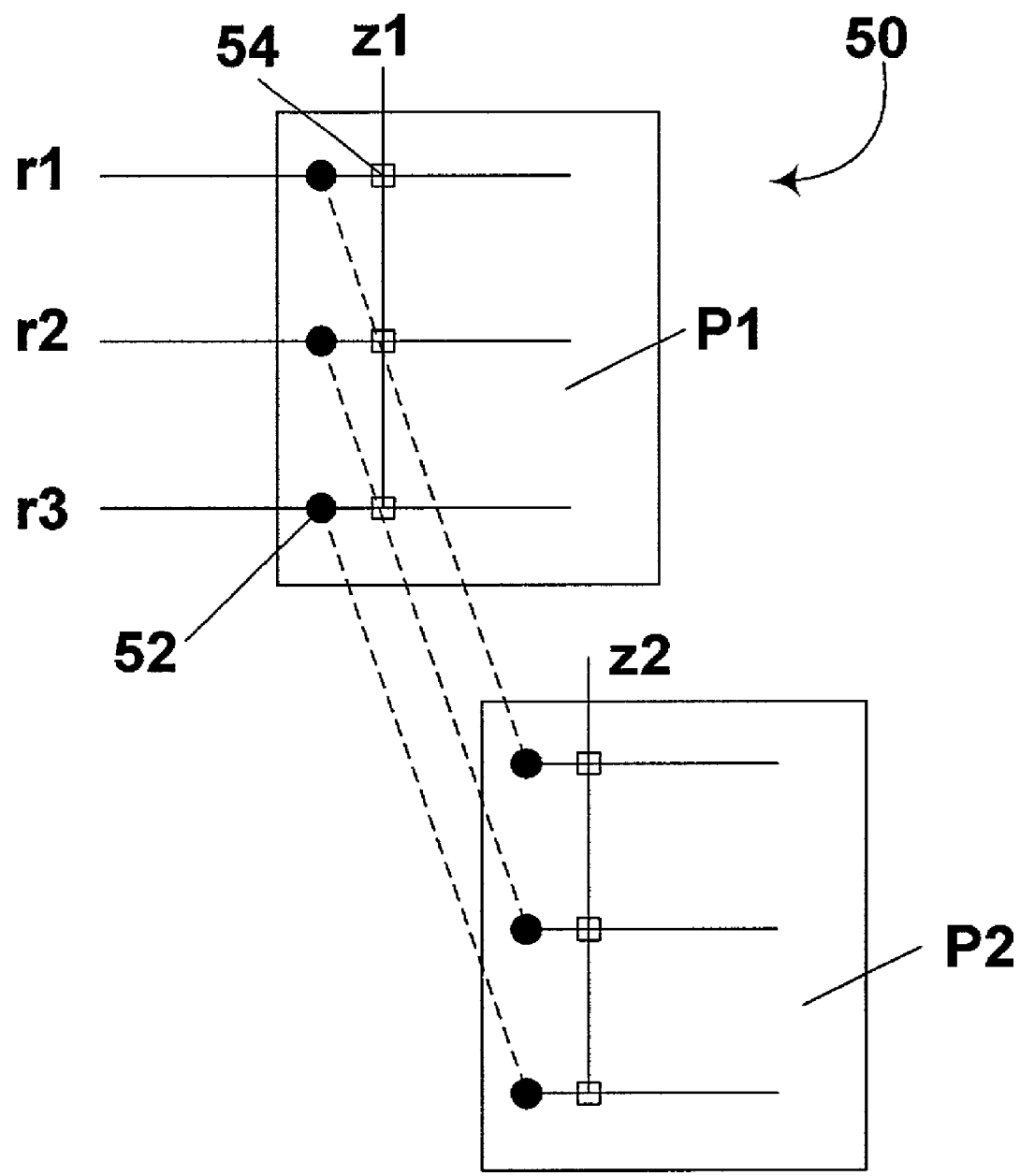
FIG. 4 is a schematic circuit diagram of a fourth three-dimensionally addressed display of the present invention having the form a multi-page electronic book.

Also, as already indicated, the separately addressable regions may be separate sheets of the display medium, as illustrated in FIG. 4. This Figure shows a fourth display (generally designated 50) of the invention having the form of a multi-page electronic book; although only two pages P1 and P2 are shown in FIG. 4, more pages would normally be present. Each page is provided with a set of row electrodes r1, r2, r3 under the control of row drivers (not shown). The row electrodes r1, r2, r3 on the various pages are connected the rows in parallel, each row electrode passing through a conductive pad 52, which extends through the pages of the display medium as a via. When the individual pages are placed adjacent and in approximate registration with each other (much like a bound book) the vias extend from the top page to the bottom page in electrical connection. Any suitable means of providing this connection may be employed, such as anisotropic tapes, zebra strips, conductive glues, and the like. Any suitable means of via formation (whether at the step where each sheet is constructed or afterwards to create a via through all sheets) may be employed. The pages P1, P2 are provided with column electrodes under the control of column drivers, both the column electrodes and the column drivers being omitted from FIG. 4 for ease of illustration. The column electrodes on the various pages are also connected in parallel by vias in the same way as the row electrodes. The third set of addressing means in the display 50 comprises a set of transistors 54, one of which is provided in each row electrode r1, r2, r3 in each page of the display. The transistors 54 are controlled by control lines z1, z2, all of the transistors on any one page being on or off simultaneously.

The display 50 operates in the following manner. One row electrode (say r1) is selected in the usual manner, and because of the presence of the vias 52 this selects r1 on each page P1, P2. However, the transistors 54 on only one of the pages P1, P2 are turned on, so that the portion of the row electrode r1 adjacent the electrophoretic medium (not shown) is selected on only one page. Accordingly, when appropriate voltages are placed on the column electrodes, only the selected row on the selected page is addressed.

Figure 5A:
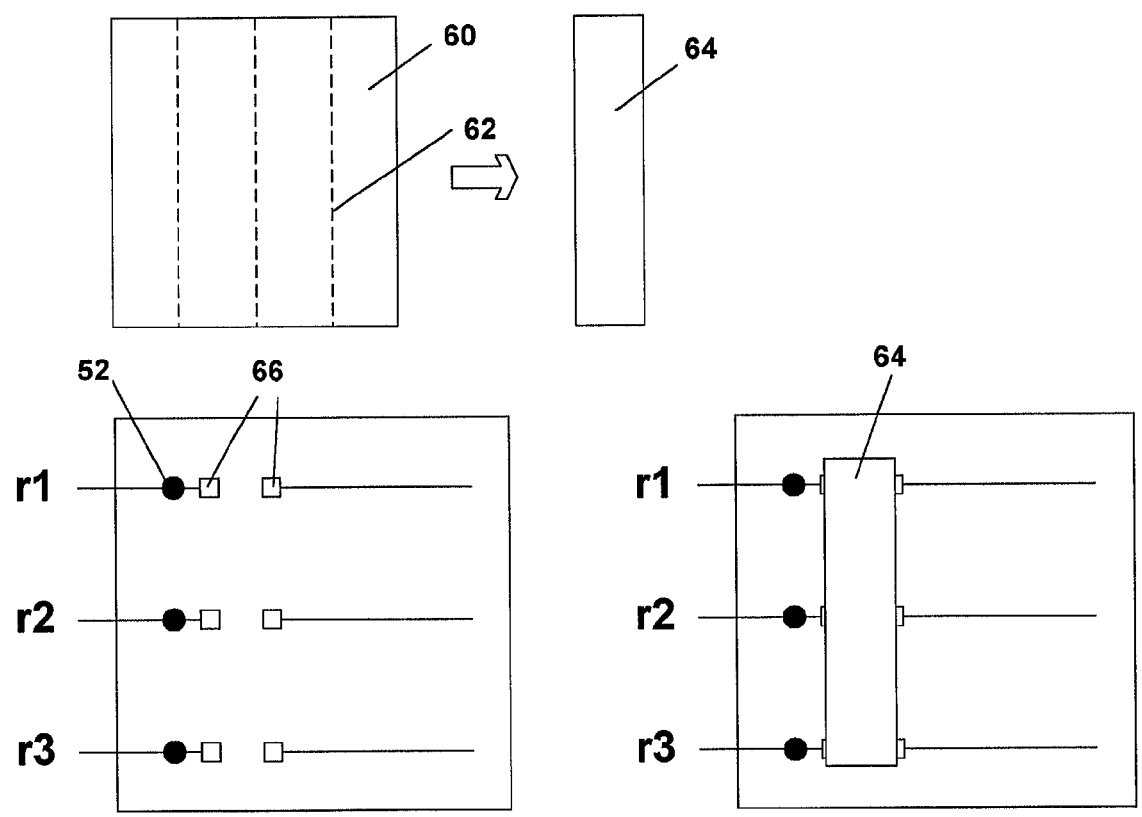
FIGS. 5A and 5B illustrate one method of providing addressing means in the type of display shown in FIG. 4 and in a similar display.

FIG. 5A illustrates a convenient method of forming the transistors 54 used in FIG. 4, or any other display using similar transistor arrays. One benefit of the display 50 shown in FIG. 4 is that the transistors are all present in narrow strips on each page. Accordingly, as shown in FIG. 5, the necessary transistors may be formed by any conventional process on a sheet 60, which is then cut, as indicated by the broken lines 62 to form multiple transistor strips 64. The individual pages of the display 50 are prepared in the form shown in FIG. 50 with the individual row electrodes broken where the transistors 54 are to be inserted, and the adjacent ends terminated in conductive pads 66. The transistor strip 64 is than secured in position on the page to form the completed structure shown in FIG. 4.

The strip 64 need not be formed on a flexible substrate. For example, a thin, inflexible strip placed in a column orientation as shown in FIG. 5A would not interfere with the flexibility of the visible portion of the display medium, since the strip 64 can be placed in a region corresponding to the spine and binding of a conventional book. The transistors in the strip 64 could also be combined with on-board drive logic, such as shift registers. In this way, each transistor could be separately addressed, either eliminating the need for row drivers or reducing the number of drive lines required.

The transistors 54 shown in FIG. 4 need not be formed by the process of FIG. 5A; the transistors may be placed onto the sheets of medium by any suitable means. For flexible media, thin film transistors (TFT's) on a flexible substrate (whether amorphous silicon or polycrystalline silicon) and including methods like flexible integrated circuits, organic TFT's, and the method of International Application Publication No. WO 96/41372 are all suitable. Alternatively, transistor formation could be performed directly on the sheet substrate.

Figure 5B:
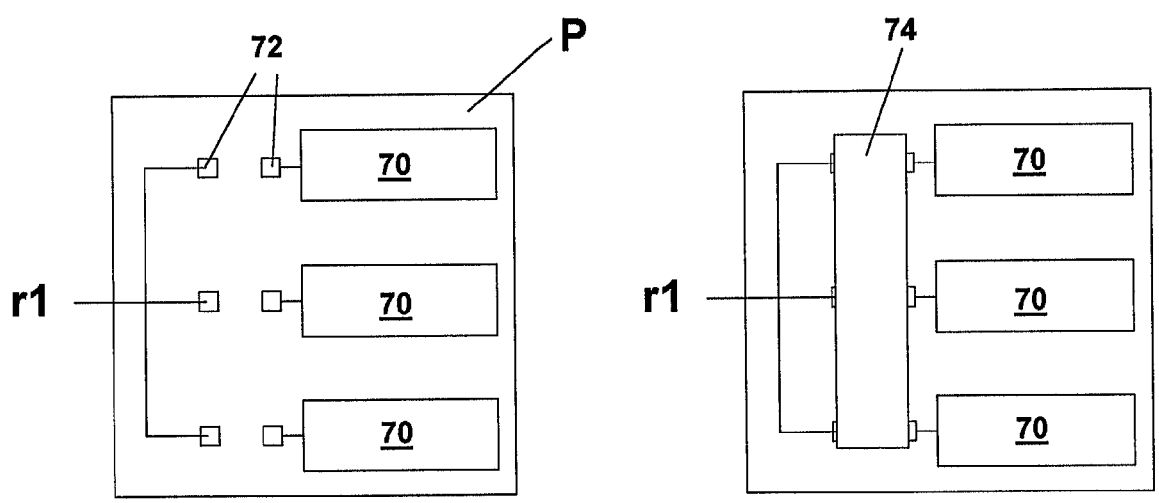

FIG. 5B shows a variation of the method of FIG. 5A which may be useful in forming the photoconductor-containing displays discussed below. As shown in Figure 5B, on a page P, which will eventually form part of a multi-page display, a single row electrode r1 is connected to a plurality of electroluminescent strips 70; only three strips 70 are shown, but more would of course normally be used. The connections between row electrode r1 and strips 70 are broken where transistors are to be inserted, the ends adjacent the break being terminated by conductive pads 72. To produce the finished page P, a transistor strip 74, formed in the same manner as in FIG. 5A, is secured across the breaks in the connections. Note that unlike the transistor strip 62 shown in FIG. 5A, in which all the transistors switch off or on simultaneously, the strip 74 requires that its transistors be individually controllable, so that a single strip 70 can be selected for operation.

As already indicated, one approach to three-dimensional addressing substitutes light valves for transistors or similar logic elements in at least one of the "dimensions" of the addressing. The light valve may be used in association with elongate light sources. Light may be emitted from all the elongate light sources which are wired in parallel, but the light valve layer is introduced between the light sources and the photoconductor layer, so that this light valve layer governs whether the light reaches the photoconductor. The embodiments of the invention shown in FIGS. 6–10 are all of this type.

Figure 6:
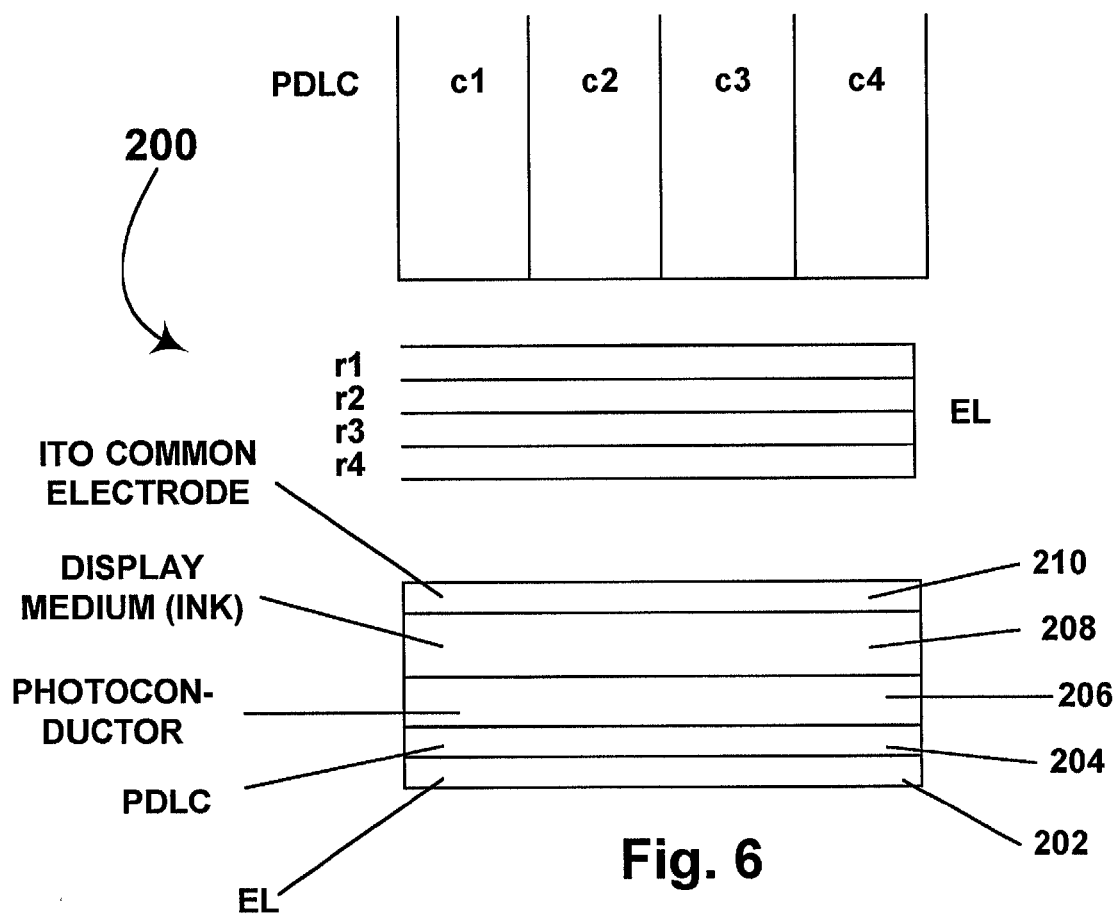
FIGS. 6–10 illustrate five different three-dimensionally addressed displays of the present invention, all of which use a photoconductor as part of an addressing method using light sources and light valves.

FIG. 6 shows one page (generally designated 200) of a display of the present invention, this page comprising, in order, an electroluminescent (EL) layer 202, a polymer-dispersed liquid crystal (PDLC) light valve layer 204, a photoconductor layer 206, an electrophoretic medium layer 208 and an indium-tin oxide (ITO) layer 210; the layer 210 is normally provided on a substrate (not shown). As indicated schematically in FIG. 6, the electroluminescent layer 202 is patterned into a plurality of elongate rows r1, r2, r3, r4 and the light valve layer 204 is patterned into a plurality of columns c1, c2, c3, c4 extending perpendicular to the rows. The columns c1, c2, c3, c4 are addressed directly and there is no need to pattern the top ITO layer into columns, although of course in a multi-page display the third dimension of addressing would be provided by transistor or similar devices to ensure that the ITO layer on only one page was selected at any given moment. A two-dimensional passive display is formed by the EL and PDLC columns, that emits light. The light may be emitted row-by-row, requiring k*y (where k and y are as previously defined) seconds to update y rows. Alternatively, if the PDLC and EL materials respond quickly relative to the photoconductor, the PDLC/EL display may be multiplexed and a complete graphical image produced that affects the photoconductor across the entire display, requiring only k seconds to update y rows.

Figure 7:
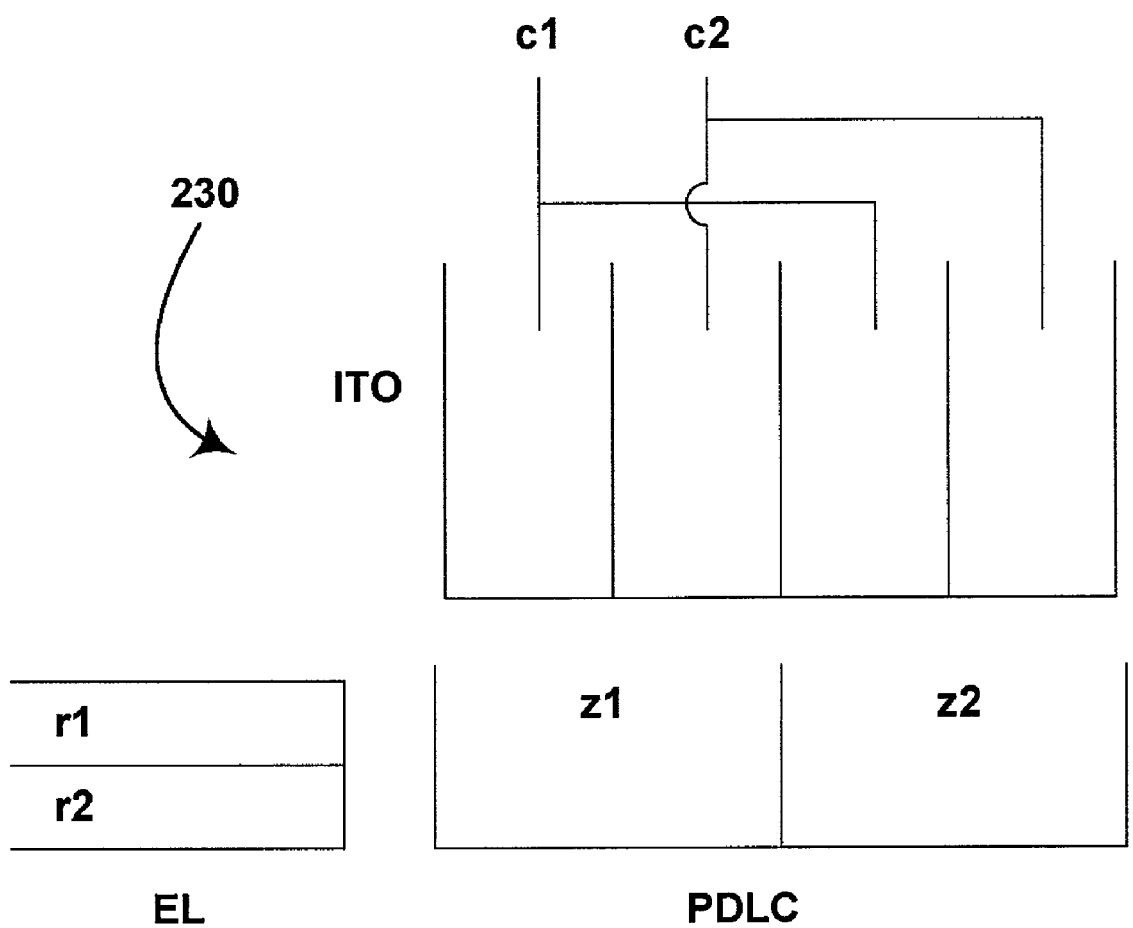

FIG. 7 shows a display (generally designated 230) which is generally similar to the display 200 shown in FIG. 6, in that the electroluminescent layer is again patterned into a plurality of elongate rows r1, r2. However in the display 230, the ITO layer is patterned to form alternating columns c1, c2 (the patterned columns correspond to groups of standard column-patterned electrode-over-ink columns), while the PDLC layer is patterned into columns which occupy the width of an adjacent pair of the columns in the ITO layer. This allows high resolution which permitting the groups of alternate ITO columns to be driven in parallel, as indicated in FIG. 7.

Figure 8:
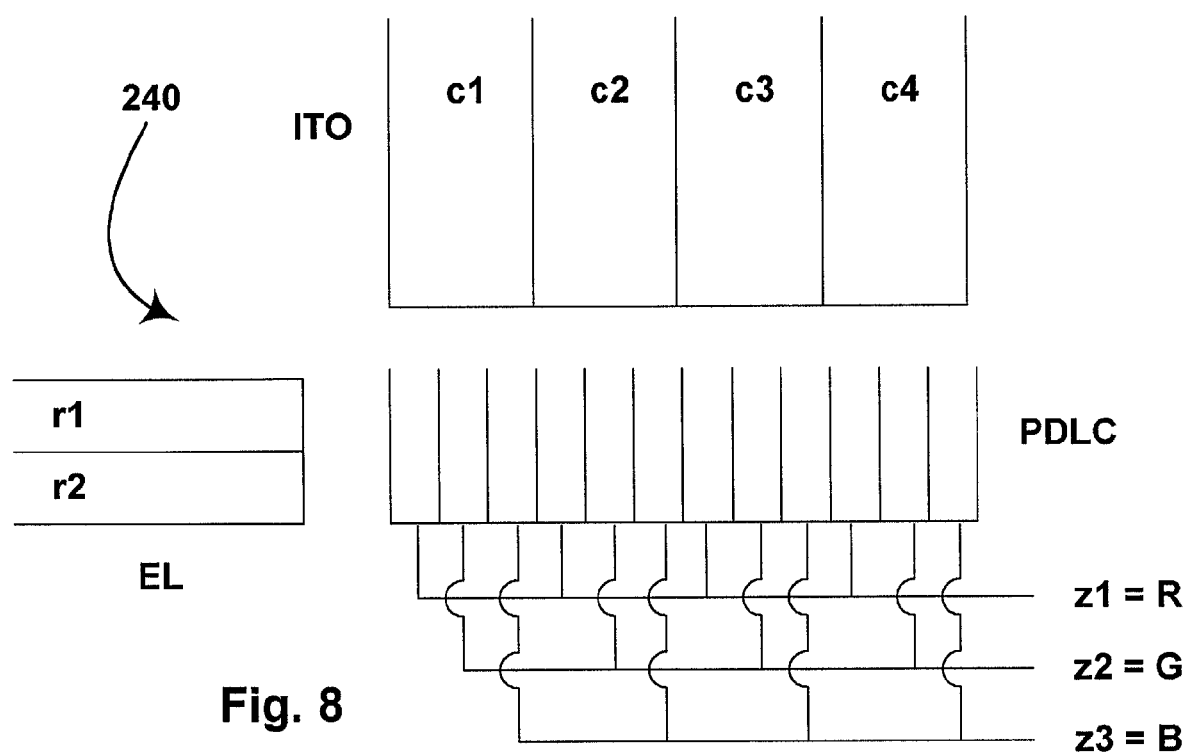

FIG. 8 shows a full color display (generally designated 240) in which the electroluminescent layer is again patterned into a plurality of elongate rows r1, r2. The ITO layer is again patterned to form columns c1, c2, c3, c4, but in this case each of these columns is individually selectable. The PDLC layer is patterned to form sub-columns one-third the width of the columns c1, c2, c3, c4 (although some other sub-multiple could be used), the sub-columns being arranged, as shown in FIG. 8, in three cyclically-repeating groups, the sub-columns of each group being driven in parallel. The three groups of sub-columns are associated with red, green and blue sub-pixels, and thus permit interlaced updating of the three colors of the display, as well as three-dimensional addressing.

Figure 9:
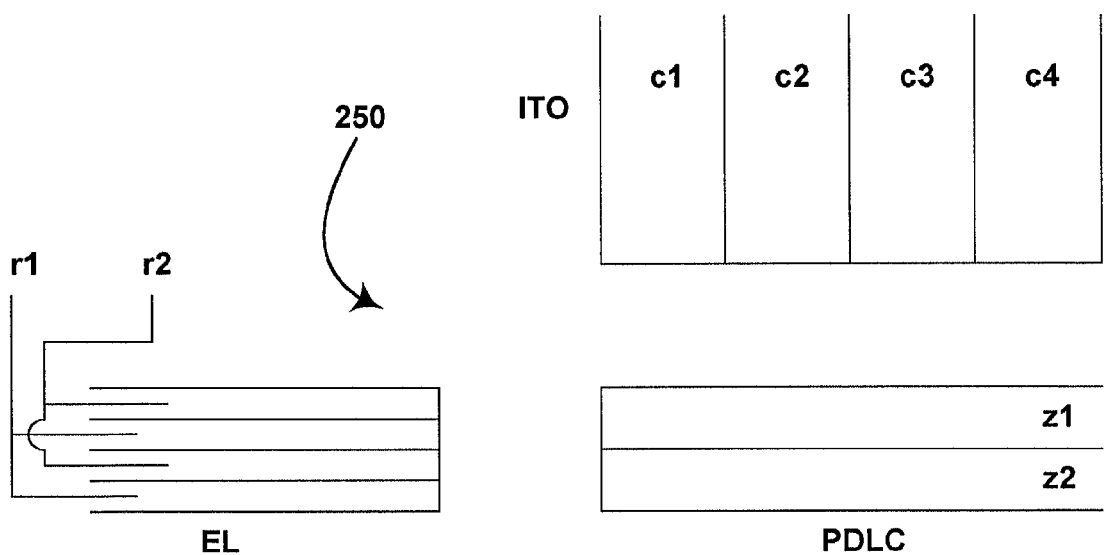

FIG. 9 shows a display (generally designated 250) in which the ITO layer is patterned to form individually-selectable columns c1, c2, c3, c4 in the same manner as in FIG. 8. However, in the display 250, the PDLC layer is patterned to form individually-selectable rows z1, z2, orthogonal to the ITO columns c1, c2, c3, c4, while the EL layer is patterned to form sub-rows parallel to, but one-half the width of, the PDLC rows. Alternate EL sub-rows are driven in parallel to achieve three-dimensional addressing.

Figure 10:
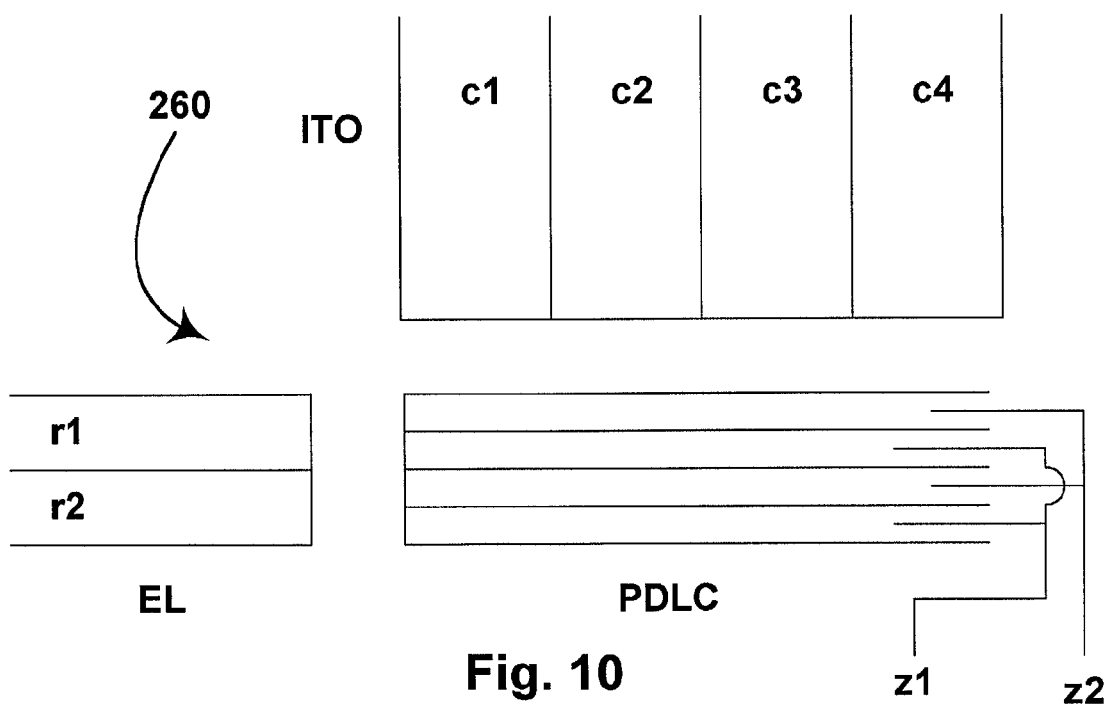

Finally, FIG. 10 shows a display (generally designated 260) which is essentially the converse of that shown in FIG. 9. The ITO layer is patterned to form individually-selectable columns c1, c2, c3, c4 in the same manner as in FIGS. 8 and 9. Again both the PDLC layer and the EL layer are patterned to form rows orthogonal to the ITO columns c1, c2, c3, c4, but in this case the EL layer is patterned to form individually-selectable rows r1, r2, while the PDLC layer is patterned to form sub-rows z1, z2 parallel to, but one-half the width of, the EL rows. Alternate PDLC sub-rows are driven in parallel to achieve three-dimensional addressing. This embodiment allows the achievement of row resolutions which are higher than may readily be achieved by patterning the EL layer.

It will readily be seen by those skilled in display technology that the principles illustrated by the preferred embodiments described above may be employed to create many combinations and variations in addressing schemes. In displays using electroluminescent or similar light-emitting layers, it is preferred that the time for which the light-emitting layer must be active be minimized to extend the life of the light-emitting layers. In addition, consideration must be given to the ease of patterning the respective layers into rows, columns and regions, and to the flexibility characteristics of the respective layers.

For example, one embodiment consists of column-patterned electrode-over-ink columns (in an ITO or similar layer) connected in parallel across z regions, a PDLC layer patterned in rows connected in parallel across z regions, and a light-emitting EL layer patterned into z regions, such as single pixels the size of pages of a multi-page display.

In such a display, to image, for example, row 24 on page 17, the column drivers are set at the appropriate voltage potential for black or white at this pixels in this row (the relevant potentials are applied on all pages but do not create an image change except where the photoconductor has been activated by light), all rows except row 24 are set at the voltage potential causing the PDLC to turn opaque, row 24 is set to the voltage potential allowing the PDLC to be transmissive, and the page 17 EL layer is activated. Thus, to address the entire book this way, a given page of EL material is active for only k*y seconds.

For reasons which will be apparent to those skilled in typography, for applications such as imaging text in the Roman alphabet in a multi-page electronic book, it is desirable that the resolution be such that the number of columns (x) is greater than the number of rows (y); furthermore, the number of rows will typically be much greater than the number of pages (z). Hence, in a preferred embodiment, the PDLC layer is patterned into z regions, such as individual pages, while the EL layer is patterned into y rows. This corresponds to a variation of the embodiment of FIG. 7 in which z1 and z2 are separate pages. One advantage of this embodiment is that to address the entire book, a given row of EL material is active for only k seconds while each page is addressed for k*z seconds, which is less than k*y seconds. Furthermore, this embodiment requires that the highest resolution be used to pattern the ITO layer, which can readily be patterned at very high resolution. Also, pages are typically flexed from side to side but not top to bottom. In this embodiment, the relatively brittle ITO lines oriented in columns receive less physical stress than the relatively flexible EL lines oriented in rows. Indeed, stiff physical columns in or attached in connection with the display substrate could be used to heighten this protection without undue reduction in the utility of the display.

In further embodiments of the invention, the photoconductive layer could itself be patterned. In addition, the embodiments described above can readily be adapted to provide a four-dimensional (WXYZ) addressing scheme if all four addressing layers (the EL, PDLC, photoconductor and ITO layers) are patterned or if the display is split into separate physical pages, as in the display shown in FIG. 4. For example, the embodiment of FIG. 7, shown as covering a single page, could be replicated across multiple pages, with an additional set of addressing means provided to select the page to be written at any given moment.

Until now, it has been assumed that the light-emitting layers used in the preferred embodiments described above do not have a threshold for light emission. Consideration will now be given to the somewhat simpler case in which the light-emitting layer has a threshold, such that light emits only above a voltage potential V.

It will readily be seen that the addressing methods suitable for a non-threshold light-emitting layer (and combinations and variations thereof) may also be used with a threshold light-emitting layer. The threshold characteristic however provides an additional degree of freedom and enables three-dimensional addressing to be accomplished with fewer physical layers (or conversely permits a four or more-dimensional addressing scheme if enough patterned layers are present).

Given a threshold light-emitting layer, an addressable sub-array (z region) may be formed as follows. The bottom electrode of the light-emitting layer is patterned for example in rows. The top clear electrode of the light-emitting layer is patterned into z regions (as above, these regions may be correspond to groups of columns, groups of rows, sub-columns, sub-rows or discrete pages, or variations and combinations thereof). As a voltage of V/2 is applied to a row in parallel across each of the z regions, a voltage of V/2 is applied to any z region that needs to be addressed. This establishes the V potential difference and light is emitted only for the row(s) in that region.

For example, suppose a line r1 addresses the 10th row bottom electrode of the light-emitting layer on all pages of an electronic multi-page book. A common top electrode of the light-emitting layer on the 14th page is activated with V/2. Only the 10th row of the 14th page is imaged.

In a further embodiment, the light-emitting layer is patterned into columns and rows, for example in the form of a passive-OLED display. Multiple pages are provided with rows and columns wired in parallel. Each page is covered by a light valve, permitting each page to be addressed individually.

Alternatively, the light valve is omitted and the photoconductor and column-patterned electrode-over-ink layers are addressed discretely for each page, again permitting each page to be addressed individually.

The principles described above are especially useful when applied to flexible bistable displays and permit a flexible book-like or newspaper-like device to be created in which the various portions of the device are imaged one at a time; the loss of power to an already-addressed region does not result in a loss of image. Driver costs are minimized by enabling more than two addressing dimensions. The techniques described herein are also useful for any photoconductively-addressed display. Nevertheless, it will be seen by one skilled in the art that the same principles may be applied to non-flexible displays. In addition, the same principles may be applied to non-bistable displays such as passively addressed LCD's to reduce driver costs if the refresh rate experienced by a given pixel is sufficiently fast.

Several of the addressing methods referenced above require that the display be addressed sequentially in a row-by-row manner. Thus the image update rate is limited by the switching speed of the electro-optic medium. Attention will now be directed to the second main aspect of the present invention, namely addressing algorithms that can speed the apparent update rate of a bistable display.

An array of island capacitors may be introduced in association with the addressing array. These capacitors can be associated with individual pixels or with cluster-level logic structures as described above. Through passive XY addressing, positive or negative charge is transmitted into the array of capacitors in a pattern matching the desired pixel image. The capacitor array may be formed by any suitable means, such as printing an electrode, a dielectric and a top electrode, either on to the ink layer or on to the photoconductor layer, or as a separate sheet that is interposed and laminated, or as part of a TFT or other logic array.

In another process, the control circuitry stores the state of the display in memory and identifies the frame-to-frame changes between each update of the display image. Only the changes are imaged, i.e., only the pixels which are changed between two adjacent frames are addressed. For small changes, such as caused by a blinking cursor or a moving mouse against a constant background, the result may be a very fast updating time.

In another process, control circuitry identifies rows that require identical column switching impulses. All such rows are activated at the same time, so that the column electrodes address all these rows simultaneously. Thus, a checkerboard graphic for any arbitrary number of rows may be imaged in at most k*2 seconds, where k is the switch time for the electro-optic medium.

In another process, the display is first set all white (or black), and then halfway between black and white. This may occur in k+k/2 seconds. As each row is thereafter addressed, the necessary addressing time for that row is at most k*0.5 seconds. The addressing time is therefore decreased to k+k/2+k*0.5 seconds. For displays with many rows, this cuts addressing time essentially in half. Note that by halfway between black and white is meant a state where the time to switch all black and the time to switch all white are equal. If the rise and fall times of the display are different this may not be at the 50% gray level.

Thus, with a relatively simple algorithm, switching times may be greatly reduced. There are many algorithms by which pre-processing could reduce overall addressing time for the display. It is helpful to introduce some definitions to describe these algorithms: The current value of any pixel may be described on a scale of 0 to 1 where 0=black and 1=white. In a bistable display, these states persist until the row is re-imaged. Similarly, each pixel (x, y) may be described as having a starting state s(x,y) and desired finishing state f(x,y) with a difference of d(x,y). Thus, the difference between the display's current and desired state may be described as a matrix array of values ranging from 1 (from white to black) to +1 (from black to white).

The row switch time vector may be defined as the maximum absolute value in each row times k seconds. The time required to address the display in a straightforward row by row fashion is the sum of the values of the row switch time vectors of the individual rows. Similarly, the row switch direction may be defined as a function of the highest value in the row (H) and the lowest value of the row (L). Assuming the display switches from white to black with speed A and from black to white with speed B, the direction vector may be calculated as:

$$(B*H+A*L)/(A+B).$$

Assuming symmetric switching times, this simplifies to the midpoint between the high and the low. In short, if the row is all white and needs to turn all black, its switch direction is 1. However if the row is black on odd columns and white on even columns, and these must each reverse, the high is 1, the low is 1, and the switch direction is 0. The switch direction represents the value for which, if all pixels in the entire row were changed by that value, the row switch time would be minimized.

For example, if a row starts at [0, 0.1, 0] and finishes at [1,0.9,1] the difference vector for that row is [1,0.8,1]. The row switch time is k*1=k seconds. The row direction is the midpoint (assuming symmetric switch times) between 1 and 0.8 or 0.9. If the row experienced a switch impulse increasing all pixels by 0.9, the row would be [0.9,1,0.9] and the new difference vector would be [0.1, −0.1, 0.1]. The new switch time would be 0.1*k seconds, and the new switch direction would be 0. If only one row were addressed in this way, the total elapsed time would be 0.9*k plus 0.1*k, or k seconds.

(Note that the switch direction is calculated based on the extreme high and low values ("the outliers"), since the switch time must be sufficient on each row for the very last pixel to finish switching. However, a more complex variation of this algorithm would involve calculation of the distribution of values across the row and determining whether it would be better to exclude some values in order to address the bulk of the row and then return to these excluded values at a later time.)

In one process of this invention, the vector describing the row switch direction for each row is calculated. All rows have switch directions ranging from 1 to 1. Next, the average value of all switch directions is calculated as P. All rows are activated and an impulse of P is applied. Next, all rows that started with a switch direction below P are identified. The average remaining switch direction of these rows is Q. These rows are activated and a switch impulse of Q is applied. Next, the rows that started with switch direction above P are identified. The average remaining switch direction of these rows is R. These rows are activated and a switch impulse of R is applied.

At this stage, all rows have switch directions ranging from −1+Q to 1−R. That is, the switch directions for all rows have come closer to 0 in just 3 cycles, taking less than k*3 seconds.

In a variation to this technique, the steps may cease after the impulse of P or the impulse of Q is applied. In another variation of the technique, each impulse P, Q and R is applied to all rows for which the net result of the impulse is to move the row's switch direction closer to zero.

These steps may be repeated for N iterations, where N is any arbitrary real number. The display is then imaged in a standard row by row fashion. In a further variant of the process, the iterations continue until Q and R are close to zero. It may readily seen that the above techniques may be combined where appropriate to achieve faster switching times in a single display.

In the technique above, groups of rows were treated, but not groups of columns. Groups of columns may be treated using the same principles and the effects of the treatment of groups of rows and columns combined for overall faster addressing. For example, the values P, Q, and R, as defined above for rows, may be calculated. The values P", Q", and R" are also calculated in a similar manner for column switch directions. The maximum (in absolute terms) is determined among Q, Q", R, and R". If Q or R is the maximum, that switch impulse is applied to all columns across designated rows. If Q" or R" is the maximum, that switch impulse is applied to all rows across designated columns. This process may be repeated for N iterations.

In a variation of this process, if Q or R is the maximum for example, the switch impulse of Q is applied to all columns against the associated rows, and then the switch impulse of R is applied to all columns against its associated rows. All 4 values Q, Q", R, R" are then recalculated, and the process may be repeated for N iterations.

Either method desirably proceeds until Q, Q", R, and R" are all close to zero. It will readily be apparent that if addressing using three or more dimensions is employed in any of the ways described above, the technique described in the foregoing passage may be extended to one or more additional dimensions by calculating values Q" and R" as well.

The selection of a specific method for a given display design may be affected by numerous factors, including the ratio of rows and columns, the relative number of rows as compared to switching speed, and by the processor power available for pre-processing, among other factors.

In another general approach, orthogonal wave functions such as are used for active addressing of LCD's are employed, adjusting (if necessary) for the bistable/multi-stable memory effect of electrophoretic and similar displays by calculating the difference in position required. These functions have a further advantage in that they have been implemented in silicon and may be simpler to calculate than a more complex approach. A variation may further be employed that takes into account the additional dimension of Z addressing.

It will readily be apparent to those skilled in the display art that the techniques described could also be used more generally to address any kind of passive display with memory effect.

From the foregoing description, it will be seen that the displays and processes of the present invention permit the number of drivers needed in a display to be greatly reduced, and provide processes by which electronic, light-emitting and light valve apparatus can usefully be combined to address a display. The present invention also provides several processes which substantially reduce the switching time of bi- and multi-stable displays.

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. An electronic display comprising an electro-optic material having a plurality of pixels, and separate first, second and third sets of addressing means for addressing said pixels, each of said pixels being associated with one addressing means in each of said three sets, such that any specific pixel of the display can be addressed by application of signals within predetermined ranges to each of the three addressing means associated with said specific pixel, wherein at least one of the sets of addressing means comprises a photoconductor, the display further comprising (a) a plurality of light sources associated with the photoconductor and selectively operable to switch the photoconductor between a conductive and a non-conductive state, the light sources being arranged as a series of elongate rows, each elongate row defining at least one row of pixels of the display: and (b) light valves disposed between the light sources and the photoconductor and arranged to control transmission of light from the light sources to the photoconductor.

2. An electronic display according to claim 1 wherein the pixels are arranged in a plurality of sub-arrays, each pixel within any specific sub-array being associated with one of the first and second sets of addressing means, the third set of addressing means having the form of a plurality of switching means, at least one of said switching means being associated with each of said sub-arrays, the switching means associated with each sub-array having an off state, in which signals on at least one of the first and second sets of addressing means are prevented from reaching the associated sub-array, and an on state, in which signals from both the first and second sets of addressing means are permitted to reach and address the associated sub-array.

3. An electronic display according to claim 2 further comprising control means arranged to control the switching means so that only the switching means associated with one sub-array is in its on state at any given moment.

4. An electronic display according to claim 2 wherein each sub-array comprises a discrete page, the pages formed by the plurality of sub-arrays being stacked on top of each other so that the entire display forms a multi-page electronic book.

5. An electronic display according to claim 4 further comprising conductive vias extending between adjacent pages and connecting at least one of the first and second sets of addressing means on said adjacent pages.

6. An electronic display according to claim 1 wherein the light valve comprises a polymer-dispersed liquid crystal.

7. An electronic display according to claim 1 wherein the light source comprises an electroluminescent material.

8. An electronic display according to claim 1 wherein the light valves are arranged as series of elongate columns crossing said elongate rows, said light sources and light valves together defining a two-dimensional array of pixels in said photoconductor.

9. An electronic display according to claim 1 wherein the first addressing means comprises a plurality of electrical conductors and means for applying potentials selectively to said conductors, the second addressing means comprises said plurality of light emitting devices and means for generating light selectively from said light emitting devices, and said third addressing means comprises said plurality of light valves and means for selectively setting said light valves to their transmissive or non-transmissive states.

10. An electronic display according to claim 1 having three sets of pixels arranged to display different colors, and wherein the third set of addressing means is arranged to select one of said three sets of pixels to be addressed at any given moment.

11. An electronic display according to claim 1 further comprising a fourth set of addressing means for addressing said pixels, said fourth set being separate from said first, second and third sets of addressing means, each of said pixels of said display being associated with one addressing means in each of said four sets, such that any specific pixel of the display can be addressed by application of signals within predetermined ranges to each of the four addressing means associated with said specific pixel.

12. An electronic display according to claim 1 wherein the electro-optic material comprises an electrophoretic medium.

13. An electronic display according to claim 12 wherein said electrophoretic medium is an encapsulated electrophoretic medium.

14. An electronic display according to claim 1 wherein the electro-optic material comprises a rotating bichromal object material.

15. An electronic display according to claim 1 wherein the electro-optic material operates by principle of one of the following: rotating bichromal objects, electrochromics, or suspended particles.

16. A method of addressing an electronic display, the method comprising:

provvidding an electro-optic material having a plurality of pixels;

providing first, second and third sets of addressing means for addressing said pixels, each of said pixels being associated with one addressing means in each of said three sets; and applying predetermined signals to the three addressing means associated with a specific pixel, thereby addressing said pixel, wherein at least one of the sets of addressing devices comprises a photoconductor, the display further comprising a plurality of light sources associated with the photoconductor and selectively operable to switch the photoconductor between a conductive and a non-conductive state, the light sources being arranged as a series of elongate rows, each elongate row defining at least one row of pixels of the display; and (b) light valves disposed between the light sources and the photoconductor and arranged to control transmission of light from the light sources to the photoconductor.

17. An electronic display comprising an electro-optic material having a plurality of pixels, a photoconductor disposed adjacent the electro-optic material and a plurality of light sources associated with the photoconductor and selectively operable to switch the photoconductor between a conductive and a non-conductive state, the light sources being arranged as a series of elongate rows, each elongate row defining at least one row of pixels of the display, the display further comprising light valves disposed between the light sources and the photoconductor and arranged to control transmission of light from the light sources to the photoconductor.

18. An electronic display according to claim 17 wherein the light valves are arranged as a series of elongate columns crossing said elongate rows, said light sources and light valves together defining a two-dimensional array of pixels in said photoconductor.

19. An electronic display according to claim 17 having an electrode on the opposed side of the electro-optic material from the photoconductor.

20. An electronic display according to claim 19 wherein the electrode is patterned into a plurality of elongate elements, the display further comprising means for applying different potentials to differing ones of the elongate elements of the electrode.

21. An electronic display according to claim 17 wherein the light valves are arranged as a series of elongate elements extending parallel to the elongate light sources.

22. An electronic display according to claim 17 wherein the elongate elements of the light valves differ in width from the elongate light sources, such that a plurality of one of the light valves and light sources are contained within the area of one of the other of the light valves and the light sources.

* * * * *